US008677193B2

(12) United States Patent
Wilson, Jr.

(10) Patent No.: US 8,677,193 B2
(45) Date of Patent: Mar. 18, 2014

(54) LIGHTPATH DIAGNOSTICS WITH VOICE ALERTS

(75) Inventor: Phillip S. Wilson, Jr., Kansas City, MO (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 13/104,211

(22) Filed: May 10, 2011

(65) Prior Publication Data

US 2012/0290886 A1 Nov. 15, 2012

(51) Int. Cl.
*G06F 11/00* (2006.01)

(52) U.S. Cl.
USPC .................................. 714/48; 714/26; 714/57

(58) Field of Classification Search
USPC ............................................ 714/26, 48, 57
See application file for complete search history.

(56) References Cited

U.S. PATENT DOCUMENTS

| 4,199,261 | A | 4/1980 | Tidd et al. | |
|---|---|---|---|---|
| 4,850,045 | A | 7/1989 | Funke | |
| 5,335,104 | A | 8/1994 | Johnson | |
| 5,546,483 | A | 8/1996 | Inoue et al. | |
| 5,867,289 | A | 2/1999 | Gerstel et al. | |
| 6,731,206 | B2 * | 5/2004 | Yang et al. | 340/500 |
| 7,085,968 | B2 * | 8/2006 | Smith | 714/57 |
| 7,233,743 | B2 | 6/2007 | Ozugur et al. | |
| 7,286,051 | B2 * | 10/2007 | Lambert | 340/531 |
| 2004/0181367 | A1 * | 9/2004 | Nguyen et al. | 702/183 |
| 2004/0225434 | A1 * | 11/2004 | Gotfried | 701/200 |
| 2006/0112318 | A1 * | 5/2006 | Yoda | 714/57 |
| 2008/0148109 | A1 | 6/2008 | Bashor et al. | |
| 2011/0047406 | A1 * | 2/2011 | Smith et al. | 714/4 |
| 2012/0216083 | A1 * | 8/2012 | Windell et al. | 714/57 |
| 2012/0278667 | A1 * | 11/2012 | Hicks et al. | 714/57 |

FOREIGN PATENT DOCUMENTS

EP 1859727 A1 11/2007
JP 2002253499 A 9/2002

OTHER PUBLICATIONS

IBM, Battery powered diagnostics, IP.com No. IPCOM000099014D, Publication Date Mar. 9, 2005, 4 pages.
IBM, Method for aggregating Light Path Diagnostics status across multiple servers, IP.com No. IPCOM000032069, Publication Date Oct. 22, 2004, 4 pages.
IBM, Device for Selectively Enabling a Light Emitting Diode Diagnostic System, IP.com No. IPCOM000016324D, Publication Date Oct. 30, 2002, 2 pages.
IBM, Light-Path Diagnostics, Undated, 1 page.

* cited by examiner

*Primary Examiner* — Yolanda L Wilson
(74) *Attorney, Agent, or Firm* — Andrea Bauer; Hoffman Warnick LLC

(57) ABSTRACT

This disclosure relates generally to identifying and locating a failed or failing system component within a computer system, and more specifically to providing indicator lights and/or associated voice alerts to indicate, identify, and locate failed or failing system components within a computer system. A method for indicating a fault in a computer system in accordance with an embodiment includes: detecting a fault in the computer system; obtaining a problem definition associated with the fault; and generating an audible voice fault alert corresponding to the problem definition.

18 Claims, 3 Drawing Sheets

LIGHTPATH DIAGNOSTICS WITH VOICE ALERTS

BACKGROUND

This disclosure relates generally to identifying and locating a failed or failing system component within a computer system, and more specifically to providing indicator lights and/or associated voice alerts to indicate, identify, and locate failed or failing system components within a computer system.

Some computer manufacturers have recently introduced computer systems (e.g., servers) that include fault identifying indicator lights (e.g., light emitting diodes (LEDs)), which are configured to light up when the computer system or an associated component of the computer system has failed or is failing. System components, such as central processing units (CPUs), dual in-line memory modules (DIMMs), power supplies, fans, adaptor slots, voltage regulators, and/or the like, within these computer systems may also have their own fault identifying LEDs. As an example, if there is an error associated with a DIMM, then the fault identifying LED associated with the DIMM will light up to indicate that the DIMM has failed or is failing. A user or service technician can then replace the faulty DIMM without having to troubleshoot whether the DIMM is responsible for the error. This allows the user or service technician to quickly diagnose the source of the error, minimizing the downtime of the computer system resulting from the failed or failing system component.

SUMMARY

The disclosure relates generally to identifying and locating a failed or failing system component within a computer system, and more specifically to providing indicator lights and/or associated voice alerts to indicate, identify, and locate failed or failing system components within a computer system.

An issue that arises with computer systems that utilize fault identifying LEDs is that such computer systems assume that users or service technicians have full sight. To this extent, visually impaired individuals may not be able to take advantage of the troubleshooting benefits provided by fault identifying LEDs in a computer system. The present invention obviates this and other deficiencies of the related art.

An embodiment of the disclosure is directed to a method for indicating a fault in a computer system, comprising: detecting a fault in a computer system; obtaining a problem definition associated with the fault; and generating an audible voice fault alert corresponding to the problem definition.

Another embodiment of the disclosure is directed to a system for indicating a fault in a computer system, comprising: a system for detecting a fault in a computer system; a system for obtaining a problem definition associated with the fault; and a fault identifying voice system for generating an audible voice fault alert corresponding to the problem definition.

Another embodiment of the disclosure is directed to a non-transitory computer readable medium having a computer program stored thereon, which when executed by a computer system, performs a method for indicating a fault in the computer system, the method comprising: detecting a fault in a computer system; obtaining a problem definition associated with the fault; and generating an audible voice fault alert corresponding to the problem definition.

Other embodiments of the disclosure provide methods, systems, program products, and methods of using and generating each, which include and/or implement some or all of the actions described herein. The illustrative embodiments of the disclosure are designed to solve one or more of the problems herein described and/or one or more other problems not discussed.

BRIEF DESCRIPTION OF THE DRAWINGS

These and other features of the disclosure will be more readily understood from the following detailed description of various embodiments taken in conjunction with the accompanying drawings.

DETAILED DESCRIPTION

As indicated above, embodiments of the disclosure relate generally to identifying and locating a failed or failing system component within a computer system, and more specifically to providing indicator lights and/or associated voice alerts to indicate, identify, and locate failed or failing system components within a computer system. As used herein, unless otherwise noted, the term "set" means one or more (i.e., at least one) and the phrase "any solution" means any now known or later developed solution.

Figure 1:
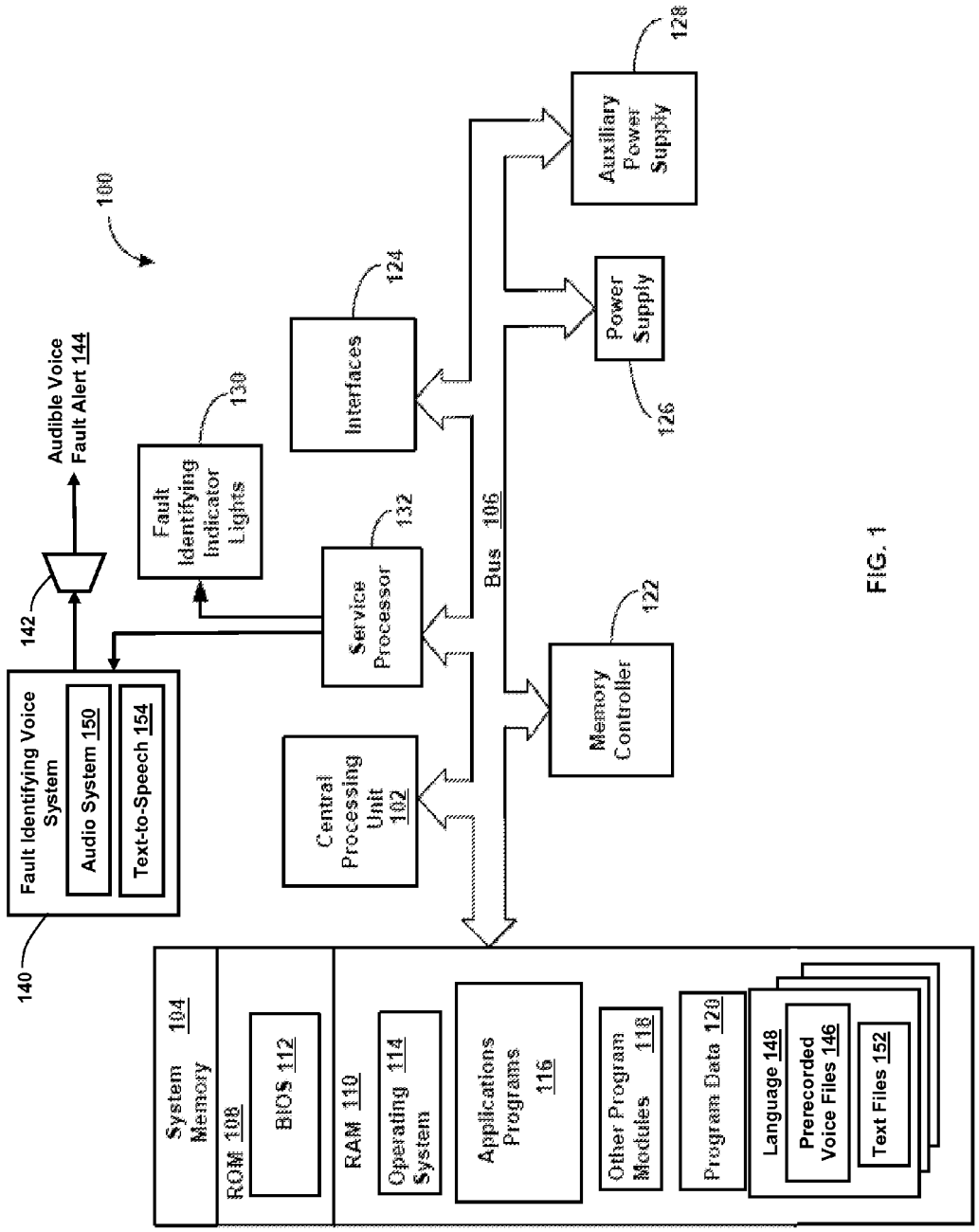
FIG. 1 depicts a high-level schematic diagram of a computer system that indicates a failed or failing system component using fault identifying indicator lights and/or associated voice alerts in accordance with embodiments of the present invention.

FIG. 1 shows a high-level schematic diagram of a computer system 100 that indicates a failed or failing system component using fault identifying indicator lights and/or associated voice alerts in accordance with embodiments of the present invention. The computer system 100 is suitable for a computer server environment, however, the system is suitable in other general purpose or special purpose computing system environments or configurations. The computer system 100 only illustrates a limited number of system components to facilitate an understanding of the scope and content of this disclosure. The computer system 100 is not limited to the components shown in FIG. 1. Those skilled in the art will recognize that the computer system 100 may have more or less components than the ones illustrated in FIG. 1. For example, the computer system 100 may comprise a plurality of server racks, each of which contain a plurality of servers (e.g., blade servers).

As shown in FIG. 1, the computer system 100 comprises one or more central processing units (CPUs) 102, a system memory 104, and a bus 106 that couples various system components to the CPU 102 and the system memory 104. The system memory 104 includes computer-readable media in the form of non-volatile memory, such as ROM 108 and/or volatile memory, such as random access memory (RAM) 110. A basic input/output system (BIOS) 112 stored in the ROM 108 contains the basic routines that help initialize the computer system 100 and run diagnostics so that other software programs can load, execute, and assume control of the computer system 100 to transfer information between components within the computer system 100. The RAM 110 typically contains data and/or program modules that are immediately accessible to and/or presently operated on by the CPU 102. By way of example, and not limitation, the RAM 110 may include an operating system 114, one or more application programs 116, other program modules 118, and program data 120.

FIG. 1 also shows a memory controller 122 which manages the flow of data going to and from system memory 104. Other system components shown in FIG. 1 comprise interfaces 124 for interfacing with various peripheral devices that connect to the computer system 100. Although FIG. 1 only shows one component to represent the interfaces, those skilled in the art will recognize that the computer system 100 may have several separate interfaces that facilitate communication with components and devices. FIG. 1 also shows a power supply 126 that supplies the energy to power the computer system 100 and an auxiliary power supply 128 that provides backup power to help support the operation of the computer system 100.

Each of the system components shown in FIG. 1 has a respective fault identifying indicator light 130 placed nearby. For ease of illustration, the fault identifying indicator lights are shown in FIG. 1 by one reference element 130. Typically, the planar or motherboard, where each of the various system components shown in FIG. 1 resides, will have a separate fault identifying indicator light 130 beside each component. In one embodiment, the fault identifying indicator lights 130 comprise LEDs, however, those skilled in the art will recognize that other light indicating devices can be used.

Also shown in FIG. 1 is a fault identifying voice system 140 that is configured to provide, via one or more speakers 142, an audible voice fault alert 144 to assist a user in identifying and locating a failed or failing system component within the computer system 100. As will be described in greater detail below, the audible voice fault alert 144 can be a prerecorded voice message, a synthesized voice message, and/or the like. In an embodiment, the audible voice fault alert 144 is provided using natural language (e.g., a regular spoken language such as English) that easily understood by a user.

In operation, a fault identifying indicator light 130 will light up when its associated system component has failed or is failing for a predetermined duty cycle. Each of the fault identifying indicator lights 130 can generate a visual pattern that is representative of the likelihood that a component is the source for a noted error. For example, each fault identifying indicator light 130 can generate a visual pattern that comprises a full steady-on light that indicates that there is a high likelihood that the component is the source for the noted error. A fast blinking visual pattern may be indicative that there is a medium likelihood that the component is the source for the detected error. A slow blinking visual pattern may be indicative that there is a lower likelihood that a component is the source for the detected error.

These are only examples of some of the types of visual patterns that the fault identifying indicator lights 130 can generate and they are not meant to be limiting. Those skilled in the art will recognize that there are a multitude of other visual patterns that the fault identifying indicator lights 130 can generate. Furthermore, those skilled in the art will recognize that there are many other ways of correlating the likelihood that a visual pattern of a fault identifying indicator light is the cause of the error. In particular, terminology such as high, medium and lower likelihood are only illustrative of one way of correlating a visual pattern to the probability of being the cause of an error.

The fault identifying voice system 140 can be used in addition to, or in lieu of, the fault identifying indicator lights 130 to assist a user in identifying and locating a failed or failing system component within the computer system 100. In an embodiment, diagnostic codes for possible faults within the computer system 100 are associated with problem definitions. Diagnostic codes, problem definitions, and/or the like are verbalized using natural language by the fault identifying voice system 140 and output through one or more speakers 142 to a user. The following description will be focused on the verbalization of problem definitions; however the present invention can be used to verbalize any type of diagnostic information that may be helpful for identifying and locating a failed or failing system component within the computer system 100.

The problem definitions can be verbalized by the fault identifying voice system 140 using several techniques. For example, in an embodiment, the problem definitions comprise prerecorded digital voice files 146 that are stored in the system memory 104. Each prerecorded digital voice file 146 is associated with one or more diagnostic error codes. The prerecorded digital voice files 146 can be provided in a single language 148 or in a plurality of languages 148 to provide multi-language support. A particular language 148 can be selected and/or set by a user via a user preference file, in a user interface (UI), and/or the like. Any suitable compressed or non-compressed digital audio file format (e.g., mp3, way, AIFF, etc.) can be used to store the prerecorded digital voice files 146 in the system memory 104.

In response to the detection of an error in the computer system 100, at least one prerecorded digital voice file 146 is selected based on at least one diagnostic error code associated with the detected error. Each selected prerecorded digital voice file 146 is provided to an audio system 150 that is configured to output the selected prerecorded digital voice file 146 through one or more speakers 142 to provide an audible voice fault alert 144. Any suitable audio system 150 capable of outputting the selected prerecorded digital voice file 146 through one or more speakers 142 can be used in the practice of the present invention.

In another embodiment, the problem definitions comprise text files 152 that are stored in the system memory 104. Each text file 152 is associated with one or more diagnostic error codes. The text files 152 can be provided in a single language 148 or in a plurality of languages 148 to provide multi-language support, wherein a user can select or set a particular language 148 via a user preference file, UI, and/or the like. In response to the detection of an error in the computer system 100, at least one text file 152 is selected based on at least one diagnostic error code associated with the error. In this embodiment, a text-to-speech system 154 is provided to convert (e.g., synthesize) the selected text files 150 into audible speech for output through one or more speakers 142 to provide an audible voice fault alert 144.

A text-to-speech system 154 generally includes a front-end and a back-end. The front-end has two major tasks. First, it converts raw text containing symbols like numbers and abbreviations into the equivalent of written-out words. This process is often called text normalization, pre-processing, or tokenization. The front-end then assigns phonetic transcriptions to each word, and divides and marks the text into prosodic units, like phrases, clauses, and sentences. The process of assigning phonetic transcriptions to words is called text-to-phoneme or grapheme-to-phoneme conversion. Phonetic transcriptions and prosody information together make up the symbolic linguistic representation that is output by the front-end. The back-end, often referred to as the synthesizer, then converts the symbolic linguistic representation into sound.

Other speech synthesis techniques can also be used in the practice of the present invention. For example, a speech synthesizer that is configured to concatenate stored speech units (e.g., phones, diphones, syllables, morphemes, words, phrases, sentences. etc.) into a desired audible voice fault alert 144 can be used.

In the computer system 100 depicted in FIG. 1, a service processor 132 is configured to activate the fault identifying indicator light(s) 130 and/or the fault identifying voice system 140 to generate the applicable visual pattern and/or verbalized problem definition(s), respectively. In particular, the service processor 132 is in communication with the BIOS 112, which will detect errors within the computer system 100 and determine causes for the errors. Typically, when the computer system 100 is powered on, the BIOS 112 obtains control of the computer system 100 and performs a power-on self test (POST). If the logic of the BIOS 112 detects errors during the POST, it will then determine the possible causes for the error and notify the service processor 132 of the errors and instruct the service processor 132 to activate the fault identifying indicator light(s) 130 and/or the fault identifying voice system 140. Other instances in which errors can be detected may occur when the BIOS 112 successfully performs the POST and passes control to the operating system 114. While the operating system 114 has control, it is possible that hardware may detect errors. If so, the hardware calls the BIOS 112 which can isolate and identify potential sources for the detected error. In the manner described above, the BIOS 112 will then notify the service processor 132 of the errors and instruct the service processor 132 to activate the fault identifying indicator light(s) 130 and/or the fault identifying voice system 140.

Figure 2:
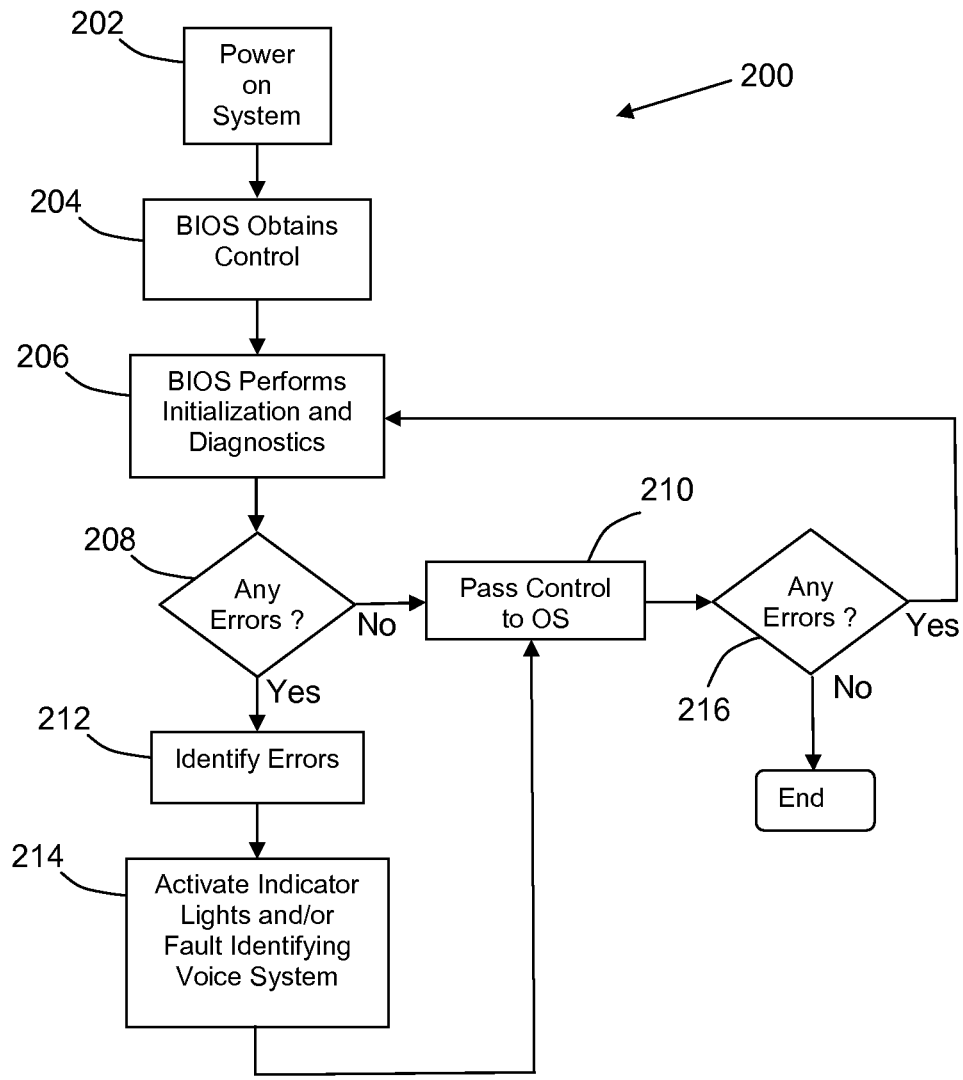
FIG. 2 is a flowchart describing some of the processing functions performed by the system shown in FIG. 1 in accordance with an embodiment.

FIG. 2 is an illustrative flowchart 200 describing some of the processing functions performed by the computer system 100 shown in FIG. 1 in accordance with an embodiment. The processing functions of FIG. 2 begin when the computer system 100 powers on at 202. At 204, the BIOS 112 obtains control of the computer system 100 and performs initialization and diagnostics (i.e., POST) at 206. If an error is not detected at 208 (No at 208), control is passed to the operating system 114 at 210. If, however, an error is detected at 208 (Yes at 208), then the BIOS 112 identifies the system component(s) that are possible sources for the error at 212. After identifying the system component(s) that are possible sources for the error at 212, the BIOS instructs the service processor 132 to activate at 214 the fault identifying indicator lights 130 and/or the fault identifying voice system 140, which are configured to operate as described above.

After the service processor 132 has activated the fault identifying voice system 140 and/or any relevant fault identifying indicator lights 130, the BIOS 112 passes control to the operating system 114 at 210. If the computer system hardware determines an error while the operating system 114 is running at 216, then the operating system 114 will stop and call out the BIOS 112 at 204. Processes 206-216 are repeated until it is determined at 216 that the diagnostic process has been completed.

The foregoing flow chart 200 of FIG. 2 shows some of the processing functions associated with using the computer system 100 shown in FIG. 1 to diagnose faults utilizing fault identifying indicator lights 130 and/or fault identifying voice system 140. In this regard, each block in the flow chart represents a process act associated with performing these functions. It should also be noted that in some alternative implementations, the acts noted in the blocks may occur out of the order noted in the figure or, for example, may in fact be executed substantially concurrently or in the reverse order, depending upon the act involved. Also, one of ordinary skill in the art will recognize that additional blocks that describe these processing acts may be added.

Figure 3:
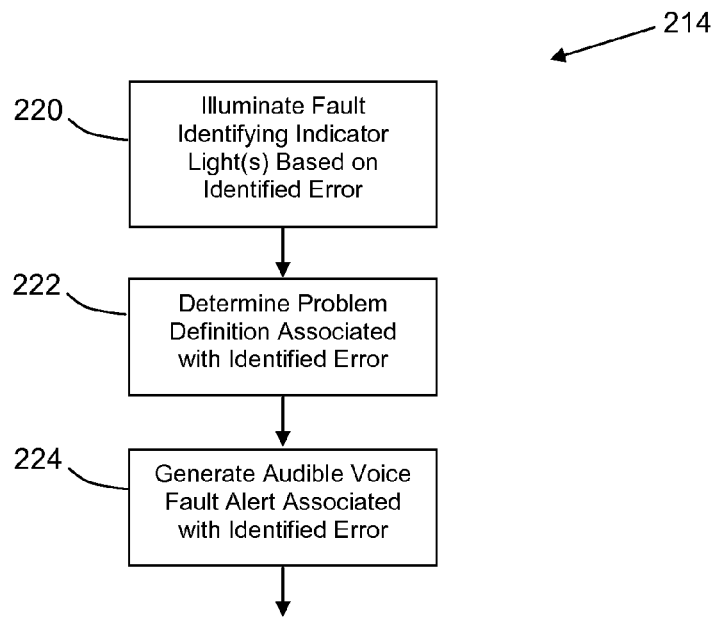
FIG. 3 is a flowchart describing additional processing functions performed by the system shown in FIG. 1 in accordance with an embodiment.

An embodiment of the process 214 in FIG. 2 is depicted in further detail in FIG. 3. In 220, one or more fault identifying indicator lights 130 are illuminated based on the identified error. In 222, the problem definition associated with the error is determined. This may involve, for example, looking up the problem definition in a look-up table and/or the like stored in system memory 104. In 224, the fault identifying voice system 140 generates, via one or more speakers 142, an audible voice fault alert 144 verbalizing the problem definition associated with the error, using either the audio system 150 or the text-to-speech system 154.

As an example, assume that CPU #1 in server #2 in a server rack is overheating and outputs an overheating error (e.g., diagnostic error code=CPU#1-Server#2-HighTemp). In response, a first fault identifying indicator light 130 is illuminated on a front panel of server #2 and a second fault identifying indicator light 130 is illuminated next to CPU#1 inside the enclosure of server #2. In addition (or in lieu of the fault identifying indicator lights 130), the fault identifying voice system 140 generates, via one or more speakers 142, an audible voice fault alert 144 regarding the overheating problem of CPU#1 in server #2 of the server rack. The fault identifying voice system 140 receives the diagnostic error code, "CPU#1-Server#2-HighTemp," looks up the problem definition associated with the diagnostic error code, and generates the appropriate audible voice fault alert 144, which in this example is "CPU #1 in server #2 is overheating."

The fault identifying voice system 140 can generate the audible voice fault alert 144 by selecting and retrieving a prerecorded digital voice file 146 corresponding to the diagnostic error code "CPU#1-Server#2-HighTemp" from the system memory 104, and then outputting the prerecorded digital voice file 146 via the audio system 150. Alternatively, the fault identifying voice system 140 can generate the audible voice fault alert 144 by retrieving from the system memory 104 a text file 152 (e.g., CPU #1 in server #2 is overheating") for the problem definition associated with the diagnostic error code, and then outputting the text file 152 through the text-to-speech system 154.

In a further embodiment, the fault identifying voice system 140 may also be used to output one or more corrective actions for addressing the error associated with the audible voice fault alert 144. For example, prerecorded digital voice files 146 and/or text files 152 that include corrective actions or other information regarding the error can be output via the audio system 150 or the text-to-speech system 154, respectively.

Figure 4:
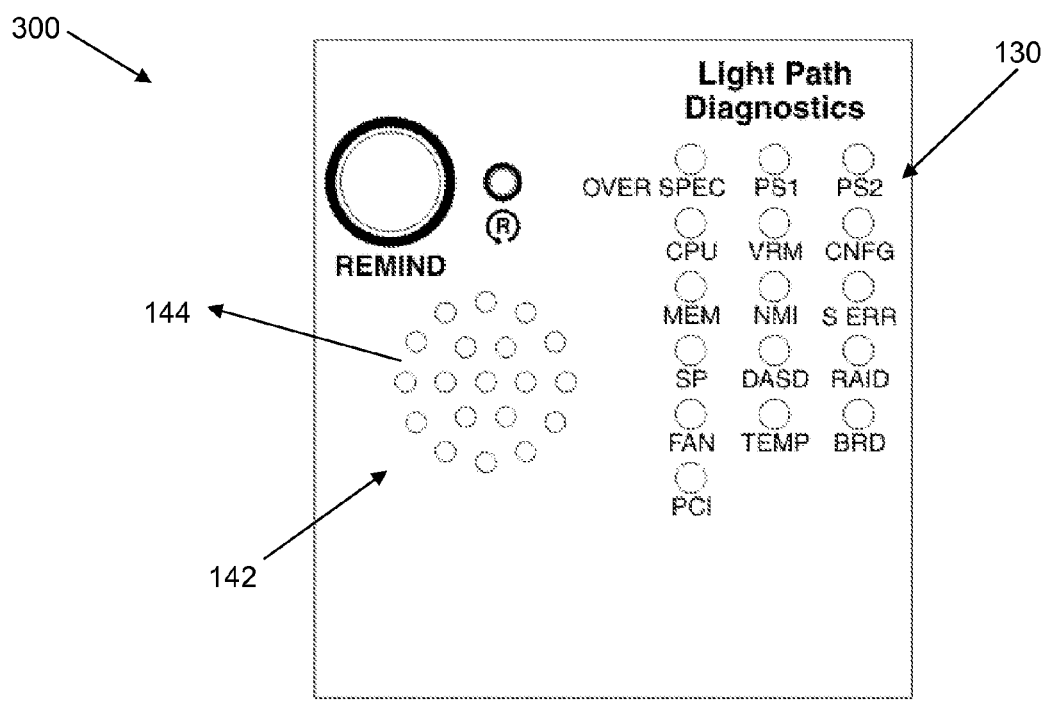
FIG. 4 depicts an illustrative panel provided on the outside of a computer system in accordance with an embodiment.

FIG. 4 depicts a panel 300 that may be provided on the outside of the computer system 100. The panel 300 includes a speaker 142 through which an audible voice alert 144 can be generated by the fault identifying voice system 140. As described above, the audible voice alert 144 provides diagnostic information that may be helpful for identifying and locating a failed or failing system component within the computer system 100. The panel 300 may also include a plurality of fault identifying indicator light(s) 130, which are configured to visually notify a user of a failed or failing system component.

Some element(s) of the present invention can take the form of a computer program product accessible from a computer-usable or computer-readable medium providing program code for use by, or in connection with a computer or any instruction execution system. For the purposes of this description, a computer-usable or computer-readable medium can be any tangible apparatus that can contain, store, communicate, propagate, or transport the program for use by, or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The foregoing description of various embodiments of the disclosure has been presented for purposes of illustration and description. It is not intended to be exhaustive or limited to the embodiments disclosed herein, and obviously, many modifications and variations are possible. Such modifications and variations that may be apparent to an individual in the art are included within the scope defined by the accompanying claims.

What is claimed is:

1. A method for indicating a fault in a computer system, comprising:
    detecting a fault in the computer system;
    obtaining a problem definition associated with the fault;
    generating an audible voice fault alert corresponding to the problem definition; and
    illuminating at least one indicator light adjacent a component of the computer system associated with the fault, the illuminating comprising generating a visual pattern representative of a likelihood that the component is a source of the fault, wherein the generating the visual pattern comprises:
        generating a full steady-on light when there is a first likelihood that the component is the source for the detected error;
        generating a first blinking visual pattern having a first blinking rate when there is a second likelihood that the component is the source for the detected error, wherein the second likelihood is less than the first likelihood; and
        generating a second blinking visual pattern having a second blinking rate slower than the first blinking rate when there is a third likelihood that the component is the source for the detected error, wherein the third likelihood is less than the second likelihood.

2. The method of claim 1, wherein the obtaining the problem definition associated with the fault further comprises:
    retrieving a prerecorded voice file from memory.

3. The method of claim 2, wherein the generating the audible voice alert corresponding to the problem definition further comprises:
    outputting the prerecorded voice file using an audio system.

4. The method of claim 1, wherein the obtaining the problem definition associated with the fault further comprises:
    retrieving a text file from memory.

5. The method of claim 4, wherein the generating the audible voice alert corresponding to the problem definition further comprises:
    converting the text file to speech using a text-to-speech system.

6. The method of claim 1, further comprising:
    selecting a language from a plurality of languages; and
    generating the audible voice fault alert corresponding to the problem definition in the selected language.

7. The method of claim 1, wherein the generating the audible voice alert corresponding to the problem definition further comprises:
    generating the audible voice alert using natural language.

8. A system for indicating a fault in a computer system, comprising:
    a system for detecting a fault in the computer system;
    a system for obtaining a problem definition associated with the fault;
    a fault identifying voice system for generating an audible voice fault alert corresponding to the problem definition; and
    an illumination system for illuminating at least one indicator light adjacent a component of the computer system associated with the fault, the illuminating comprising generating a visual pattern representative of a likelihood that the component is a source of the fault, wherein the generating the visual pattern comprises:
        generating a full steady-on light when there is a first likelihood that the component is the source for the detected error;
        generating a first blinking visual pattern having a first blinking rate when there is a second likelihood that the component is the source for the detected error, wherein the second likelihood is less than the first likelihood; and
        generating a second blinking visual pattern having a second blinking rate slower than the first blinking rate when there is a third likelihood that the component is the source for the detected error, wherein the third likelihood is less than the second likelihood.

9. The system of claim 8, wherein the system for obtaining the problem definition associated with the fault further comprises:
    a system for retrieving a prerecorded voice file from memory.

10. The system of claim 9, wherein the system for generating the audible voice alert corresponding to the problem definition further comprises:
    a system for outputting the prerecorded voice file using an audio system.

11. The system of claim 8, wherein the system for obtaining the problem definition associated with the fault further comprises:
    a system for retrieving a text file from memory.

12. The system of claim 11, wherein the system for generating the audible voice alert corresponding to the problem definition further comprises:
    a system for converting the text file to speech using a text-to-speech system.

13. The system of claim 8, further comprising:
    a system for selecting a language from a plurality of languages; and
    a system for generating the audible voice fault alert corresponding to the problem definition in the selected language.

14. The system of claim 8, wherein the system for generating the audible voice alert corresponding to the problem definition further comprises:
    a system for generating the audible voice alert using natural language.

15. A non-transitory computer readable medium having a computer program stored thereon, which when executed by a computer system, performs a method for indicating a fault in the computer system, the method comprising:
    detecting a fault in the computer system;
    obtaining a problem definition associated with the fault;
    generating an audible voice fault alert corresponding to the problem definition; and
    illuminating at least one indicator light adjacent a component of the computer system associated with the fault, the illuminating comprising generating a visual pattern representative of a likelihood that the component is a source of the fault, wherein the generating the visual pattern comprises:
generating a full steady-on light when there is a first likelihood that the component is the source for the detected error;
generating a first blinking visual pattern having a first blinking rate when there is a second likelihood that the component is the source for the detected error, wherein the second likelihood is less than the first likelihood; and
generating a second blinking visual pattern having a second blinking rate slower than the first blinking rate when there is a third likelihood that the component is the source for the detected error, wherein the third likelihood is less than the second likelihood.

16. The non-transitory computer readable medium of claim 15, wherein the obtaining the problem definition associated with the fault further comprises:
retrieving a prerecorded voice file from memory; and
wherein the generating the audible voice alert corresponding to the problem definition further comprises:
outputting the prerecorded voice file using an audio system.

17. The non-transitory computer readable medium of claim 15, wherein the obtaining the problem definition associated with the fault further comprises:
retrieving a text file from memory; and
wherein the generating the audible voice alert corresponding to the problem definition further comprises:
converting the text file to speech using a text-to-speech system.

18. The non-transitory computer readable medium of claim 15, the method further comprising:
selecting a language from a plurality of languages; and
generating the audible voice fault alert corresponding to the problem definition in the selected language.

* * * * *